June 24, 1924.
A. P. KYLE
1,498,661
CURTAIN CARRIER
Filed May 6, 1922
2 Sheets-Sheet 1
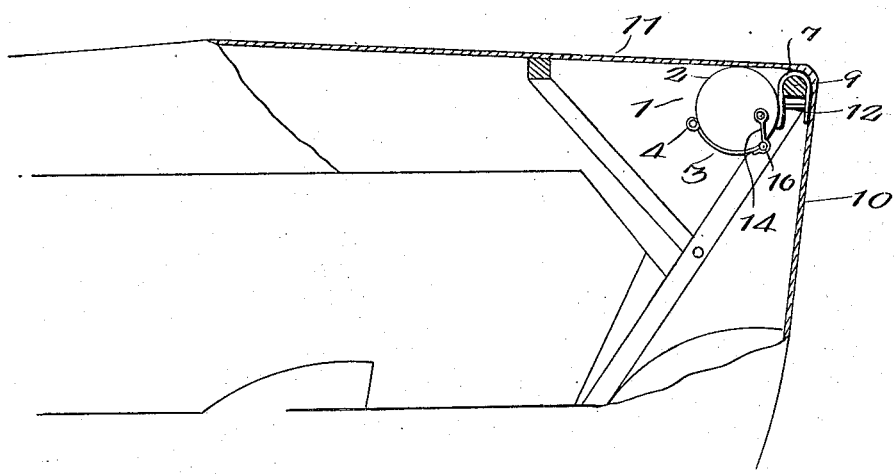
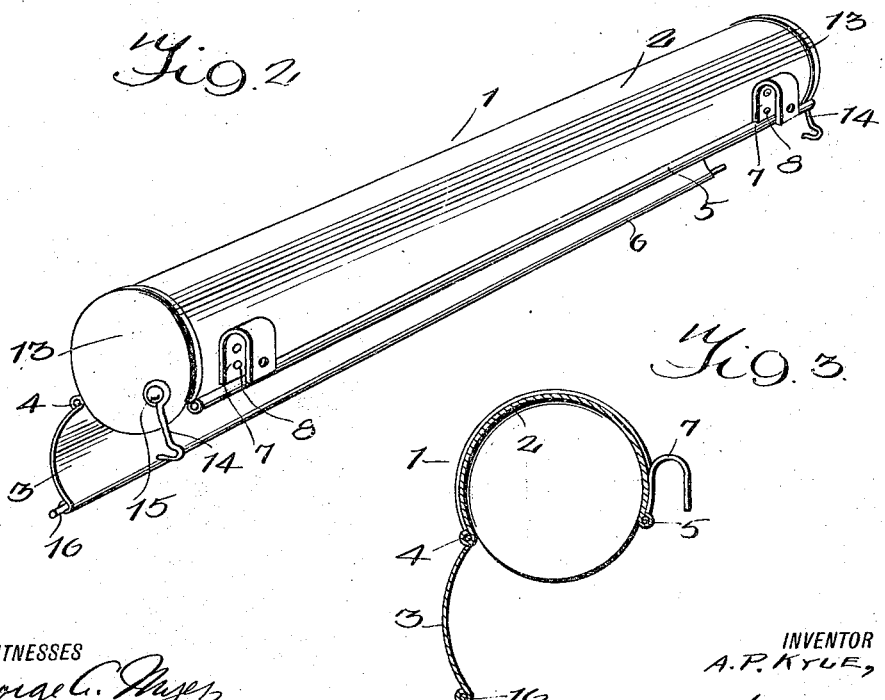
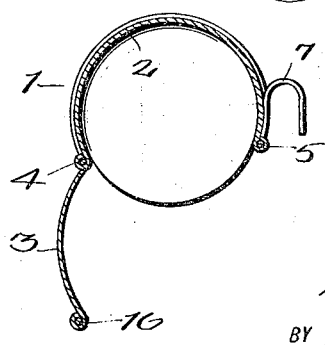
WITNESSES
INVENTOR
A. P. KYLE,
BY
ATTORNEYS

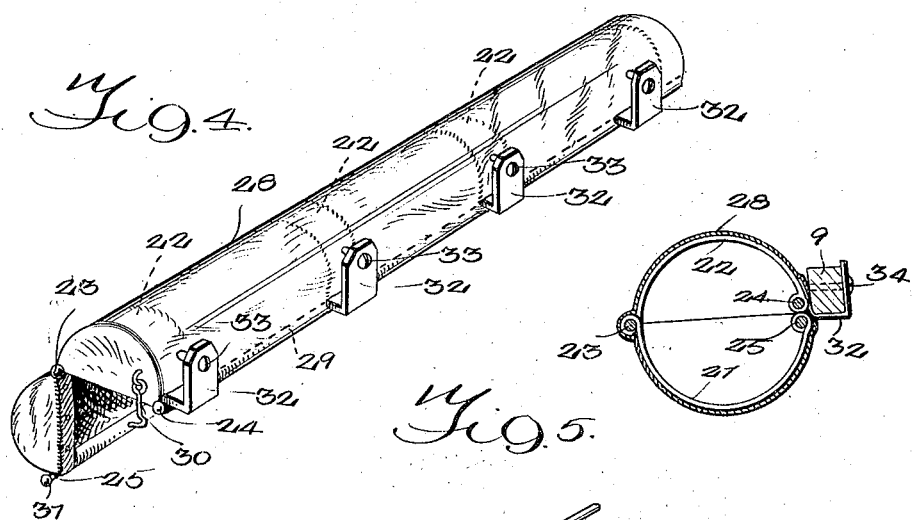

Patented June 24, 1924.

1,498,661

UNITED STATES PATENT OFFICE.

AULCIE P. KYLE, OF PITKIN, LOUISIANA.

CURTAIN CARRIER.

Application filed May 6, 1922. Serial No. 559,081.

*To all whom it may concern:*

Be it known that I, AULCIE P. KYLE, a citizen of the United States, and a resident of Pitkin, in the parish of Vernon and State of Louisiana, have invented certain new and useful Improvements in Curtain Carriers, of which the following is a specification.

My invention is a carrier or holder attachable to an automobile to carry the curtains of the automobile when the latter are not in use, and it consists in the combinations, constructions and arrangements herein described and claimed.

An object of my invention is to provide a simple and economical device of the character described which is adapted to be attached to a part of an automobile and to be positioned out of the way and at the same time permit of convenient access thereto so that the curtains of the automobile can be quickly and conveniently placed therein or removed therefrom.

A further object of my invention is to provide a device of the character described which is adapted to hold relatively wide automobile curtains in such manner as to obviate the necessity of folding the curtains, whereby the life of the curtains will be extended beyond the ordinary.

Other objects and advantages will be apparent from the following description, and the novel features of the invention will be particularly outlined in the appended claims.

My invention is illustrated in the accompanying drawings forming part of this application, in which:—

Figure 1 is a fragmentary view, partly in side elevation and partly in section, showing a practical embodiment of my invention operatively applied to the top supporting frame of an automobile, Figure 2 is a perspective view of the embodiment of the invention exhibited in Figure 1 detached, Figure 3 is a transverse section through the form of the device illustrated in the preceding views, Figure 4 is a view similar to Figure 2 showing a second form of the device, Figure 5 is a transverse section through the second form of the device and through a support to which attached, and Figure 6 is a perspective view of a portion of a frame for the form of the device exhibited in Figures 4 and 5.

Referring now to the drawings, and particularly to Figures 1 to 3 inclusive thereof, one form of device embodying my invention comprises a substantially cylindrical body 1 consisting of two complemental longitudinal sections 2 and 3, respectively, each of the sections being arcuate in cross sectional contour and the section 2 being of greater arcuate extent than the section 3. The sections 2 and 3 are formed of light gage metal and are fashioned at meeting edges thereof to provide co-operating sleeve or eye portions which are mounted upon a pintle 4, whereby the sections are swingingly attached to each other. The sections 2 and 3 are formed at their free edges to abut each other when in closed position, being rolled or fashioned to provide a hollow bead or sleeve portion 5 for the section 2 and a similar hollow bead or sleeve portion 6 for the section 3.

The section 2 is provided with attaching members 7 in the form of U-shaped hangers or hooks which are secured by rivets 8 or the like in spaced relation to the section 2 adjacent to the bead portion 5 thereof and which are adapted to be hooked over a body 9 of the top supporting frame for an automobile 10, whereby the body 1 will be supported adjacent to the top 11 of the automobile, as illustrated in Figure 1. The sides or arms of the attaching members 7 may be connected by fastening members 12 projected therethrough below the bow 9, whereby the body 1 will be securely held against accidental displacement from the position in which shown.

The body 1 is provided with ends 13 of circular contour, which ends are fitted into the section 2 and are secured to the latter in any suitable manner. Latching members, such as the hooks 14, are pivotally attached, as at 15, to the ends 13 in position to engage lateral projections 16 which may be ends of a rod or of rods received in the sleeve portion 6 of the section 3. When the hooks 14 engage the projections 16, the section 3 will be held in closing relation to the section 2, as illustrated in Figure 1, and when the hooks 14 disengage the projections 16, the section 3 is permitted to swing by gravity to the position in which illustrated in Figures 2 and 3.

From the foregoing description of the various parts of the device the operation thereof may be readily understood. The device can be conveniently attached to the bow 9 at the rear of the automobile or removed therefrom and when the curtains of the automobile are not in use, the same may be rolled and placed within the body 1, in which place the curtains will be protected from the elements, will be out of the way, and at the same time will be readily accessible when again required. Since the curtains can be placed in the body 1 in rolled condition, the folding thereof, as is ordinarily necessary when the curtains are placed beneath an automobile seat or in other relatively restricted space, is obviated, and the curtains are, therefore, not likely to be impaired by reason of their storage in the device.

In Figures 4 to 6 inclusive, I show a second form embodying the same invention. In the second form of the device, a frame is provided and comprises spaced hinges 20 each consisting of complemental arcuate hinge leaves 21—22 having eye or sleeve portions at their adjacent ends mounted upon a pintle rod 23 and having sleeve portions at their free ends through which rods 24 and 25 extend. The rods 23 and 24 are additionally connected adjacent to their ends by bars 26 which form chords of the end hinge leaves 22. The rods 23 and 25 are connected adjacent to their ends by substantially straight bars 27 which form chords of the end hinge leaves 21, the arrangement being such that either the bars 27 or 26 can be swung about the axis of the pintle 23 to lie in flatwise superimposed relation in respect to the other bars.

The frame so formed is covered with a suitable fabric, such as a composition leather, which covering is indicated at 28 in Figures 4 and 5. The edges of the portions of the cover disposed on the complemental sections of the frame will be drawn around the rods 24 and 25 and the bars 27 and 26 and held in position on the frame in any suitable known manner, as by stitching, such as indicated at 29. The portions of the cover at the ends of the complemental frame sections are provided with complemental segmental end portions for the body of the device and one of the sections of the body has the end portions thereof provided with hooks 30 for engaging the end portions 31 of the rod at the free end of the second section of the body, whereby the two sections of the body can be held in closed position as illustrated in Figure 5.

In the form of the device disclosed in Figures 4 to 6 inclusive, the rod 25 is provided with the end portions 31 and the section of the body including the hinge leaves 22 is, therefore, provided with attaching members 32 in the form of angular bars adapted to partially encircle the bow 9 of the top supporting member of an automobile and having perforations 33 through which nails 34 or the like may be projected to secure the device to the bow.

The operation of the form of the device exhibited in Figures 4 to 6 inclusive is identical in essential respects with the operation of the first described form of the device.

Obviously my invention is susceptible of embodiment in forms other than those illustrated in the accompanying drawings, and I, therefore, consider as my own all modifications and adaptations thereof which fairly fall within the scope of the appended claims.

I claim:

1. A device of the character described comprising a body consisting of a frame formed of a plurality of hinges, the leaves of said hinges being of arcuate shape, rods connecting the hinges in spaced parallel relation, a fabric covering for the frame, means for releasably holding the hinges in closed relation, and means carried by the body for engaging a fixed support.

2. In a curtain carrier, a pair of arcuate sections hinged together with the convexly curved surfaces thereof outermost, said sections being complemental one to the other, one of said sections being provided at its free edge with a sleeve, a rod received in said sleeve and extending beyond the opposite ends of said one section, and hooks carried by the other section for engaging with the extending end portions of said rod to releasably hold said sections closed.

AULCIE P. KYLE.